United States Patent [19]

van Koesveld

[11] Patent Number: 4,652,793
[45] Date of Patent: Mar. 24, 1987

[54] CATHODE-RAY TUBE PROVIDED WITH A LUMINESCENT INDIUM ORTHOBORATE

[75] Inventor: Jan L. van Koesveld, Eindhoven, Netherlands

[73] Assignee: U.S. Philips Corporation, New York, N.Y.

[21] Appl. No.: 817,322

[22] Filed: Jan. 9, 1986

[30] Foreign Application Priority Data

Feb. 11, 1985 [NL] Netherlands ......................... 8500369

[51] Int. Cl.$^4$ ............................................ C09K 11/465
[52] U.S. Cl. ............................. 313/468; 252/301.4 R; 313/467
[58] Field of Search .............................. 313/467, 468; 252/301.4 R

[56] References Cited

U.S. PATENT DOCUMENTS 2,736,712  2/1956  Runciman et al. .......... 252/301.4 R
3,550,033  12/1970  Ohlmann et al. ......... 252/301.4 R X
3,595,803  7/1971  Dugger ........................ 252/301.4 R
4,524,300  6/1985  Ruffen et al. ............ 252/301.4 R X

FOREIGN PATENT DOCUMENTS 57-192485  11/1982  Japan ............................. 252/301.4 R

OTHER PUBLICATIONS

Sevasfyanov et al., "Chem. Abstracts", vol. 78, 1973, 166773q.
Blasse et al., "Physics Letters", vol. 25A, No. 1, 1967, pp. 29-30.

Primary Examiner—Jack Cooper
Attorney, Agent, or Firm—Norman N. Spain

[57] ABSTRACT

A cathode-ray tube provided with a luminescent screen comprising a luminescent indium orthoborate activated by trivalent chromium. The tube yields an efficient emission in the near infrared part of the spectrum. If the borate further comprises Eu as an activator, an efficient $Eu^{3+}$ emission is obtained in addition to the Cr emission.

3 Claims, 3 Drawing Figures

CATHODE-RAY TUBE PROVIDED WITH A LUMINESCENT INDIUM ORTHOBORATE

The invention relates to a cathode-ray tube provided with a luminescent screen comprising a luminescent indium orthoborate.

Such a tube is known from U.S. Pat. No. 3,394,084. This Patent Specification discloses luminescent indium orthoborates (fundamental lattic $InBO_3$), which are activated by a lanthanide element, the activator replacing part of the indium in the fundamental lattice. Materials suitable for practical applications are the borates activated by trivalent terbium and having a green emission and the borates activated by trivalent europium and having a red emission. Furthermore, it is known from Netherlands patent application No. 8401175 (PHN. 11.007) and also from European patent application No. 0 111 303 to activate $InBO_3$ both by $Tb^{3+}$ and by $Eu^{3+}$. These double-activated borates yield mixed colours between green and red and have high brightnesses if the activator contents are kept low.

The known luminescent indium borates have a decay time of the order of 20 msec (medium decay). Due to their suitable emission colour, their high brightness and their medium decay character, these known borates are particularly suitable for use in cathode-ray tubes for data display, the so-called DGD tubes (Data Graphics Display).

It is known that trivalent chromium can serve as an activator in given fundamental lattices, more particularly in aluminates and in aluminium oxide, in which chromium is substituted at Al sites. Such materials generally luminesce in the deep-red and/or infrared part of the spectrum. In Chemical Abstracts, Vol. 97, 1982, No. 82135n, for example, chromium-activated $YAl_3B_4O_{12}$ (huntite crystal structure) is mentioned. For given applications, it is desirable that a luminescent material for a cathode-ray tube should be available which emits in the infrared part of the spectrum.

The invention therefore has for its object to provide cathode-ray tubes which are provided with a material luminescing efficiently at least in the infrared part of the spectrum.

A cathode-ray tube according to the invention is provided with a luminescent screen comprising a luminescent indium orthoborate and is characterized in that the indium orthoborate is activated by trivalent chromium.

Experiments leading to the invention have shown that the indium orthoborate lattice having the crystal structure of calcite yields upon activation by chromium a very efficiently luminescing material having an emission in the near infrared part of the spectrum (an emission band having a maximum at approximately 810 nm and having a half-value width of approximately 120 nm). There was no reason that such an efficient luminescence would be expected or predicted because the luminescence of transition metals, such as chromium, is strongly dependent upon the crystal structure and the composition of the fundamental lattice. This is in contrast with, for example, the rear earth metals, which are only slightly influenced by the lattice and therefore can luminesce efficiently in a great variety of fundamental lattices.

An advantage of a cathode-ray tube according to the invention is that the chromium-activated indium borate does not or does not substantially exhibit any visible emission. This is of importance in those cases in which only infrared radiation is desired and visible radiation can be disturbing. A further advantage is that the luminescent indium borate can be obtained in the form of a very fine-grained powder (average grain size, for example, approximately 1 $\mu$m). The efficiency can then be as high as that of coarser powders. A fine powder has the advantage that the quantity of the powder required for a luminescent screen is generally smaller than when using a coarser powder.

A cathode-ray tube according to the invention is to be preferred, which is characterized in that the borate has a composition defined by the formula $In_{1-p}Cr_pBO_3$, in which $1\cdot10^{-5} \leq p \leq 5\cdot10^{-2}$. At these values of the chromium content p, high energy efficiencies are in fact obtained. The highest efficiencies are attained at values of p in the range of $3\cdot10^{-4} \leq p \leq 1\cdot10^{-2}$.

An advantageous embodiment of a cathode-ray tube according to the invention is characterized in that the luminescent screen contains at least one further luminescent material. The further luminescent material(s) to be used can be chosen from the materials suitable for use in display cathode-ray tubes, for example, manganese-activated zinc silicate, luminescent sulphides, such as Ag- and Cu-activated zinc cadmium sulphide, Eu- and-/or Tb-activated indium borate, and $Eu^{3+}$-activated oxysulphides. In this manner, a data graphics display tube (DGD tube) can be obtained, in which it is possible to use a so-called light pen. Such a light pen is an element selectively sensitive to the IR radiation of the Cr-activated indium borate, with which the position on the picture screen can be accurately determined. It is then possible to add desired information or to erase it at areas on the screen selected by means of the light pen, as used in computer-aided designing or computer-aided manufacture (CAD, CAM).

A particular embodiment of a cathode-ray tube according to the invention is characterized in that the indium orthoborate is further activated by trivalent europium and has a composition defined by the formula $In_{1-p-q}Cr_pEu_qBO_3$, in which $3\cdot10^{-4} \leq q \leq 1\cdot10^{-1}$. The chromium content p is then chosen in the aforementioned range of $1\cdot10^{-5} \leq p \leq 5\cdot10^{-2}$. The indium borates activated both by chromium and europium yield both the chromium emission in the infrared and the line emission of $Eu^{3+}$ at mainly 590–600 nm. It has been found that the efficiency of the overall (Cr and Eu) emission can be very high. The desired contributions of Cr and Eu to the emission can be adjusted by a suitable choice of the Cr and Eu concentrations, respectively. It has surprisingly been found that the Eu emission in the Cr- and Eu-activated indium borates can be very efficient, an acceptable yield of Cr emission being retained. In a cathode-ray tube provided with such an indium borate, it is therefore possible to obtain both the picture display (at least the display of red pictures) and the infrared signal for determining the position from only one luminescent material. It has further been found that the Eu emission in the Cr- and Eu-activated indium borates can be even more efficient than in the known borates activated by Eu only. In these cases, the chromium emission is comparatively low and tubes provided with such luminescent borates have advantages as compared with the tubes provided with the known Eu-activated borate if only red emission is desired and infrared radiation is not disturbing.

The luminescent indium borates according to the invention can be obtained by a solid state reaction at high temperature of mixtures of oxides of the constituents or of compounds yielding these oxides on heating. The reaction generally takes place in air at a temperature of 1100°–1400° C.

Embodiments of cathode-ray tubes according to the invention will now be described more fully with reference to a number of examples and measurements and drawings.

Figure 1:
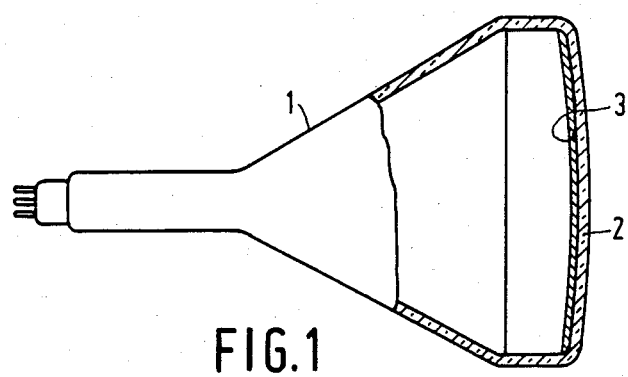
FIG. 1 shows diagrammatically and partly in section a cathode-ray tube according to the invention.

In FIG. 1 of the drawing, reference numeral 1 denotes an envelope of a cathode-ray tube. The envelope 1 comprises a screen 2 provided with a luminescent layer 3. The luminescent screen (2, 3) is provided with a luminescent chromium-activated indium orthoborate. The screen may further comprise, for example when used in a DGD tube, further luminescent materials, which are mixed with the chromium-activated indium borate.

EXAMPLE OF PREPARATION

Figure 2:
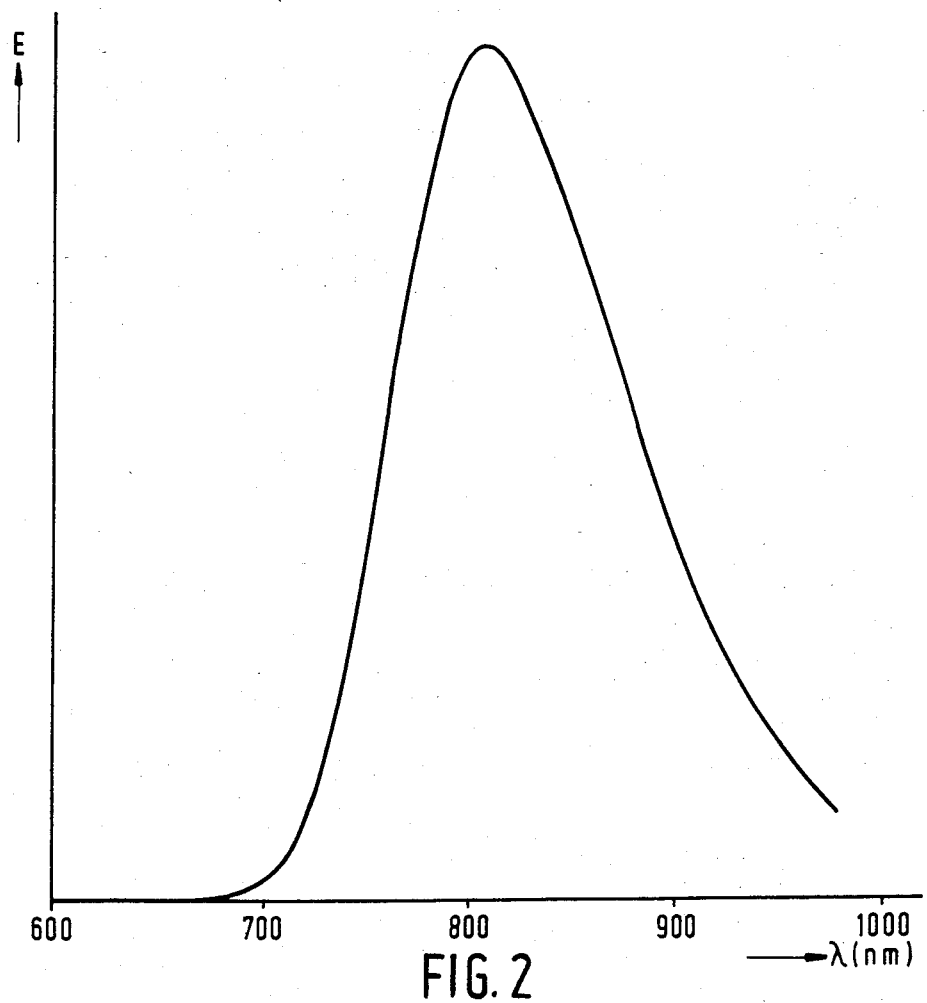
FIG. 2 shows a graph of the spectral energy distribution of the emission of a chromium-activated indium borate.

A mixture was made of 0.02 mol of $In_2O_3$, 0.08 mol of $H_3BO_3$ and $2 \cdot 10^{-5}$ mol of $Cr_2O_3$. The mixture contained 100 mol.% excess of the $H_3BO_3$. The mixture was baked in a furnace in air for 8 hours at 1200° C. After cooling, the product was washed with water, after which it was dried, pulverized and sieved. The powder obtained was a luminescent indium borate according to the formula $In_{0.999}Cr_{0.001}BO_3$. Upon cathode-ray excitation, this borate had an emission in a band having a maximum at 810 nm and a half-value width of 120 nm. The spectral energy distribution of the emission of this borate is shown in FIG. 2 of the drawings. The wavelength $\lambda$ (in nm) is plotted on the abscissa of the graph of FIG. 2 and the radiation energy E per constant wavelength interval (in arbitrary units) is plotted on the ordinate. The energy efficiency of the borate was found to be 28% with respect to a standard. A green-luminescing Cu- and Al-activated zinc cadmium sulphide was used as a standard (P22, energy efficiency 18%).

In the same manner as described in the aforementioned example of preparation, a number of indium borates according to the formula $In_{1-p}Cr_pBO_3$ were obtained, in which the chromium content p was varied. These borates all exhibited the same emission as that of the material of the aforementioned example of preparation. The results of the measurement of the energy efficiency $\eta$ (with respect to the same standard) are indicated in Table 1.

TABLE 1

| | p | $\eta$ |
|---|---|---|
| 1 | $1 \cdot 10^{-4}$ | 18 |
| 2 | $3 \cdot 10^{-4}$ | 24 |
| 3 | $1 \cdot 10^{-3}$ | 28 |
| 4 | $3 \cdot 10^{-3}$ | 27 |
| 5 | $1 \cdot 10^{-2}$ | 22 |
| 6 | $3 \cdot 10^{-2}$ | 15 |

A large number of indium borates activated both by chromium and by trivalent europium were prepared by a method similar to that described in the above example of preparation. The required europium was added to the baking mixture as $Eu_2O_3$. In the following Table 2, the results of the measurement of the energy efficiency $\eta$ (with respect again to the aforementioned standard) are indicated. Each column in Table 2 comprises the measurements on materials having a given chromium content p and a varying europium content q. Each row in the Table gives the measurements on materials having a fixed Eu content and a varying chromium content. In general, both the energy efficiency of the chromium emission (see the lines in the Table designated by a) and the energy efficiency of the europium emission (see the lines designated by b) are measured on each material. The lines in the Table designated by c show the overall efficiency (the sum of the Cr and the Eu emission). This series of experiments further included a few indium borates activated only by europium (see column with p=0; these materials are not in accordance with the invention). A comparison of the measurement values of the efficiency of the Eu emission (given between brackets) with that of indium borates according to the invention shows that this efficiency can be higher in the materials according to the invention than in the known materials.

TABLE 2

| | | Cr (p) | | | | | | |
|---|---|---|---|---|---|---|---|---|
| | | $3 \cdot 10^{-3}$ | $1 \cdot 10^{-3}$ | $3 \cdot 10^{-4}$ | $1 \cdot 10^{-4}$ | $5 \cdot 10^{-5}$ | 0 | |
| Eu (q) | $3 \cdot 10^{-4}$ | 27,0 | 27,0 | 23,0 | — | — | — | a |
| | | 0,5 | 1,5 | 3,0 | — | — | — | b |
| | | 27,5 | 28,5 | 26,0 | — | — | — | c |
| | $1 \cdot 10^{-3}$ | 26,0 | 26,0 | 21,5 | — | — | — | a |
| | | 1,5 | 4,5 | 8,0 | — | — | — | b |
| | | 27,5 | 30,5 | 29,5 | — | — | — | c |
| | $3 \cdot 10^{-3}$ | 24,0 | 24,0 | 19,0 | 15,0 | — | (0) | a |
| | | 3,5 | 9,5 | 14,5 | 15,5 | — | (14) | b |
| | | 27,5 | 33,5 | 33,5 | 30,5 | — | (14) | c |
| | $6 \cdot 10^{-3}$ | 21,0 | 19,5 | 15,5 | 12,0 | 10,0 | (0) | a |
| | | 4,5 | 12,0 | 17,0 | 24,0 | 22,5 | (16,5) | b |
| | | 25,5 | 31,5 | 32,5 | 36,0 | 32,5 | (16,5) | c |
| | $1 \cdot 10^{-2}$ | 19,5[1] | 18,5 | 14,5 | 11,0 | 8,5 | (0) | a |
| | | 6,0 | 14,5 | 20,5 | 26,5 | 25,5 | (20) | b |
| | | 25,5 | 33,0 | 35,0 | 37,5 | 34,0 | (20) | c |
| | $3 \cdot 10^{-2}$ | — | — | 12,0 | 7,5 | 7,5 | (0) | a |
| | | — | — | 23,5 | 31,5[2] | 26,5 | (23,5) | b |
| | | — | — | 35,5 | 39,0 | 34,0 | (23,5) | c |
| | $6 \cdot 10^{-2}$ | — | — | 10,5 | 7,0 | 5,0 | (0) | a |
| | | — | — | 25,5 | 28,5 | 26,5 | (27)[2] | b |
| | | — | — | 36,0 | 35,5 | 31,5 | (27) | c |

Figure 3:
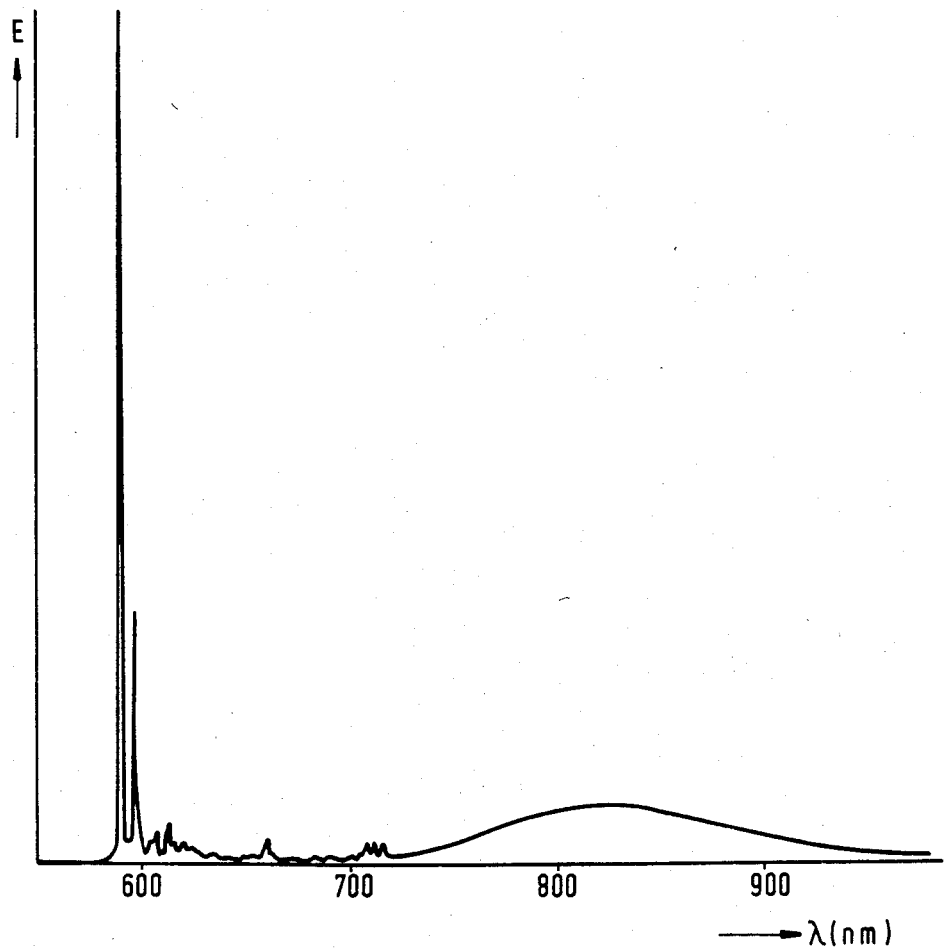
FIG. 3 shows in the same manner as FIG. 2 the emission of a chromium- and europium-activated indium borate.

[a]Energy efficiency of the chromium emission;
[b]Energy efficiency of the europium emission;
[c]overall energy efficiency.
[1]The spectral energy distribution of this luminescent borate according to the formula $In_{0.987}Cr_{0.003}Eu_{0.010}BO_3$ is shown in the graph of FIG. 3.
[2]The borate according to the invention ($In_{0.9699}Cr_{0.0001}Eu_{0.03}BO_3$) has an energy efficiency of the Eu emission which is well over 16% higher than that of the known $In_{0.94}Eu_{0.06}BO_3$. The borate according to the invention has an Eu content which is only half that of the known borate.

What is claimed is:

1. A cathode-ray tube provided with a luminescent screen comprising a luminescent indium orthoborate, activated by trivalent chromium of the formula $In_{1-p}Cr_pBO_3$ in which $1 \cdot 10^{-5} \leq p \leq 5 \cdot 10^{-2}$, said orthoborate exhibiting an emission band maximum at approximately 810 nm and a half-value bandwidth of approximately 120 nm under cathode ray excitation.

2. A cathode-ray tube as claimed in claim 1, characterized in that $3 \cdot 10^{-4} \leq p \leq 1 \cdot 10^{-2}$.

3. A cathode-ray tube provided with a luminescent screen comprising a luminescent indium orthoborate activated by trivalent chromium and trivalent europium of the formula $In_{1-p-q}Cr_pEu_qBO_3$ in which $1 \cdot 10^{-5} \leq p \leq 5 \cdot 10^{-2}$ and $3 \cdot 10^{-4} \leq q \leq 1 \cdot 10^{-1}$, said orthoborate exhibiting a $Cr^{+3}$ emission band maximum at approximately 810 nm and a half-value bandwidth of approximately 120 nm, and a $Eu^{+3}$ line emission at mainly 590–600 nm under cathode ray excitation.

* * * * *